United States Patent
Dixit et al.

(10) Patent No.: US 11,704,316 B2
(45) Date of Patent: Jul. 18, 2023

(54) SYSTEMS AND METHODS FOR DETERMINING PEAK MEMORY REQUIREMENTS IN SQL PROCESSING ENGINES WITH CONCURRENT SUBTASKS

(71) Applicants: Ankit Dixit, Bengaluru (IN); Shubham Tagra, Bangalore (IN)

(72) Inventors: Ankit Dixit, Bengaluru (IN); Shubham Tagra, Bangalore (IN)

(73) Assignee: Qubole, Inc., Santa Clara, CA (US)

( * ) Notice: Subject to any disclaimer, the term of this patent is extended or adjusted under 35 U.S.C. 154(b) by 12 days.

(21) Appl. No.: 16/520,868

(22) Filed: Jul. 24, 2019

(65) Prior Publication Data
US 2020/0379998 A1    Dec. 3, 2020

Related U.S. Application Data

(60) Provisional application No. 62/855,056, filed on May 31, 2019.

(51) Int. Cl.
*G06F 16/00* (2019.01)
*G06F 16/2453* (2019.01)
(Continued)

(52) U.S. Cl.
CPC ...... *G06F 16/24542* (2019.01); *G06F 9/5016* (2013.01); *G06F 16/24532* (2019.01); *G06F 16/9024* (2019.01); *G06F 2209/5019* (2013.01)

(58) Field of Classification Search
CPC ............. G06F 16/24532; G06F 9/5066; G06F 9/5016; G06F 16/24542; G06F 16/9024; G06F 2209/5019
See application file for complete search history.

(56) References Cited

U.S. PATENT DOCUMENTS 5,603,001 A    2/1997   Sukegawa et al.
5,907,675 A    5/1999   Aahlad
(Continued)

FOREIGN PATENT DOCUMENTS

EP     1117039 A3     9/2005
EP     2615803 A2     7/2013
WO   2014138745 A3    12/2014

OTHER PUBLICATIONS

F. Amorim, "Complete Showplan Operators", 2011, Simple Task Publishing. (Year: 2011).*
(Continued)

*Primary Examiner* — Ajith Jacob
(74) *Attorney, Agent, or Firm* — Landmark Intellectual Property Law, LLC; Gregory M Murphy

(57) ABSTRACT

The present invention is generally directed to systems and methods of determining and provisioning peak memory requirements in Structured Query Language Processing engines. More specifically, methods may include determining or obtaining a query execution plan; gathering statistics associated with each database table; breaking the query execution plan into one or more subtasks: calculating an estimated memory usage for each subtask using the statistics; determining or obtaining a dependency graph of the one or more subtasks; based at least in part on the dependency graph, determining which subtasks can execute concurrently on a single worker node; and totaling the amount of estimated memory for each subtask that can execute concurrently on a single worker node and setting this amount of estimated memory as the estimated peak memory requirement for the specefic database query.

6 Claims, 2 Drawing Sheets

(51) Int. Cl.
*G06F 9/50* (2006.01)
*G06F 16/901* (2019.01)

(56) References Cited

U.S. PATENT DOCUMENTS

| | | | |
|---|---|---|---|
| 6,192,391 B1 | 2/2001 | Ohtani | |
| 6,460,027 B1 | 10/2002 | Cochrane et al. | |
| 6,601,062 B1 | 7/2003 | Deshpande et al. | |
| 6,847,962 B1 | 1/2005 | Cochrane et al. | |
| 7,680,994 B2 | 3/2010 | Buah et al. | |
| 7,844,853 B2 | 11/2010 | Barsness et al. | |
| 7,848,261 B2 | 12/2010 | Fachan | |
| 8,260,840 B1 | 9/2012 | Sirota et al. | |
| 8,296,419 B1 | 10/2012 | Khanna et al. | |
| 8,996,482 B1 | 3/2015 | Singh et al. | |
| 9,049,746 B2 | 6/2015 | Periyalwar et al. | |
| 9,451,013 B1 | 9/2016 | Roth et al. | |
| 9,483,785 B1 | 11/2016 | Corley et al. | |
| 9,531,607 B1 | 12/2016 | Pai et al. | |
| 9,571,561 B2 | 2/2017 | Jang | |
| 9,645,859 B1 | 5/2017 | Dash et al. | |
| 9,860,569 B1 | 1/2018 | Wilms et al. | |
| 10,069,693 B1 | 9/2018 | Daptardar et al. | |
| 2002/0145983 A1 | 10/2002 | Block et al. | |
| 2002/0157113 A1 | 10/2002 | Allegrezza | |
| 2003/0005350 A1 | 1/2003 | Koning et al. | |
| 2003/0065874 A1 | 4/2003 | Marron et al. | |
| 2004/0193626 A1 | 9/2004 | Colby et al. | |
| 2005/0222965 A1* | 10/2005 | Chaudhuri | G06F 16/217 |
| 2005/0222996 A1 | 10/2005 | Yalamanchi | |
| 2005/0278387 A1 | 12/2005 | Kamada et al. | |
| 2007/0094290 A1 | 4/2007 | Oka et al. | |
| 2007/0195810 A1 | 8/2007 | Fachan | |
| 2007/0294493 A1 | 12/2007 | Buah et al. | |
| 2008/0141065 A1 | 6/2008 | Okabe | |
| 2009/0043873 A1 | 2/2009 | Barsness et al. | |
| 2009/0182779 A1 | 7/2009 | Johnson | |
| 2009/0222418 A1 | 9/2009 | Layman | |
| 2009/0254916 A1* | 10/2009 | Bose | G06F 9/5066 718/104 |
| 2009/0327854 A1 | 12/2009 | Chhajer et al. | |
| 2010/0153482 A1 | 6/2010 | Kim et al. | |
| 2010/0306286 A1 | 12/2010 | Chiu et al. | |
| 2011/0119449 A1 | 5/2011 | Neerincx et al. | |
| 2011/0167221 A1 | 7/2011 | Pangal et al. | |
| 2011/0314485 A1 | 12/2011 | Abed | |
| 2012/0047339 A1 | 2/2012 | Decasper et al. | |
| 2012/0102291 A1 | 4/2012 | Cherian et al. | |
| 2012/0130988 A1* | 5/2012 | Nica | G06F 16/24542 707/718 |
| 2012/0151272 A1 | 6/2012 | Behrendt et al. | |
| 2012/0215763 A1 | 8/2012 | Hughes et al. | |
| 2012/0304192 A1 | 11/2012 | Grove et al. | |
| 2013/0110764 A1 | 5/2013 | Wilf | |
| 2013/0124483 A1 | 5/2013 | Furuhashi et al. | |
| 2013/0132967 A1 | 5/2013 | Soundararajan et al. | |
| 2013/0179881 A1 | 7/2013 | Calder et al. | |
| 2013/0189969 A1 | 7/2013 | Periyalwar et al. | |
| 2013/0204948 A1 | 8/2013 | Zeyliger et al. | |
| 2013/0227558 A1 | 8/2013 | Du et al. | |
| 2013/0232254 A1 | 9/2013 | Srikanth et al. | |
| 2013/0254171 A1 | 9/2013 | Grondin et al. | |
| 2013/0290771 A1 | 10/2013 | Kim et al. | |
| 2013/0318379 A1 | 11/2013 | Seshadri et al. | |
| 2013/0332612 A1 | 12/2013 | Cai et al. | |
| 2014/0040575 A1 | 2/2014 | Horn | |
| 2014/0059306 A1 | 2/2014 | Bender et al. | |
| 2014/0059552 A1 | 2/2014 | Cunningham et al. | |
| 2014/0067992 A1 | 3/2014 | Saeki | |
| 2014/0095505 A1 | 4/2014 | Blanchflower et al. | |
| 2014/0149590 A1 | 5/2014 | Mallipeddi et al. | |
| 2014/0156777 A1 | 6/2014 | Subbiah et al. | |
| 2014/0189109 A1 | 7/2014 | Jang | |
| 2014/0195558 A1 | 7/2014 | Murthy et al. | |
| 2014/0279838 A1 | 9/2014 | Tsirogiannis et al. | |
| 2015/0222705 A1 | 8/2015 | Stephens | |
| 2015/0234688 A1 | 8/2015 | Dageville et al. | |
| 2015/0242197 A1 | 8/2015 | Alfonso et al. | |
| 2015/0379026 A1 | 12/2015 | Todd et al. | |
| 2016/0012108 A1* | 1/2016 | Hu | G06F 16/24532 707/771 |
| 2016/0065627 A1 | 3/2016 | Pearl et al. | |
| 2016/0179581 A1 | 6/2016 | Soundararajan et al. | |
| 2016/0224638 A1 | 8/2016 | Bestler et al. | |
| 2016/0350371 A1 | 12/2016 | Das et al. | |
| 2016/0371193 A1 | 12/2016 | Floratou et al. | |
| 2017/0337138 A1 | 11/2017 | Li et al. | |
| 2018/0159727 A1 | 6/2018 | Liu et al. | |

OTHER PUBLICATIONS

International Search Report for PCT/US2015/045419 completed Oct. 2, 2015; 2 pages.
International Search Report for PCT/US2015/050174 completed Nov. 16, 2015; 2 pages.
International Search Report for PCT/US2015/057003 completed Dec. 13, 2015; 2 pages.

* cited by examiner

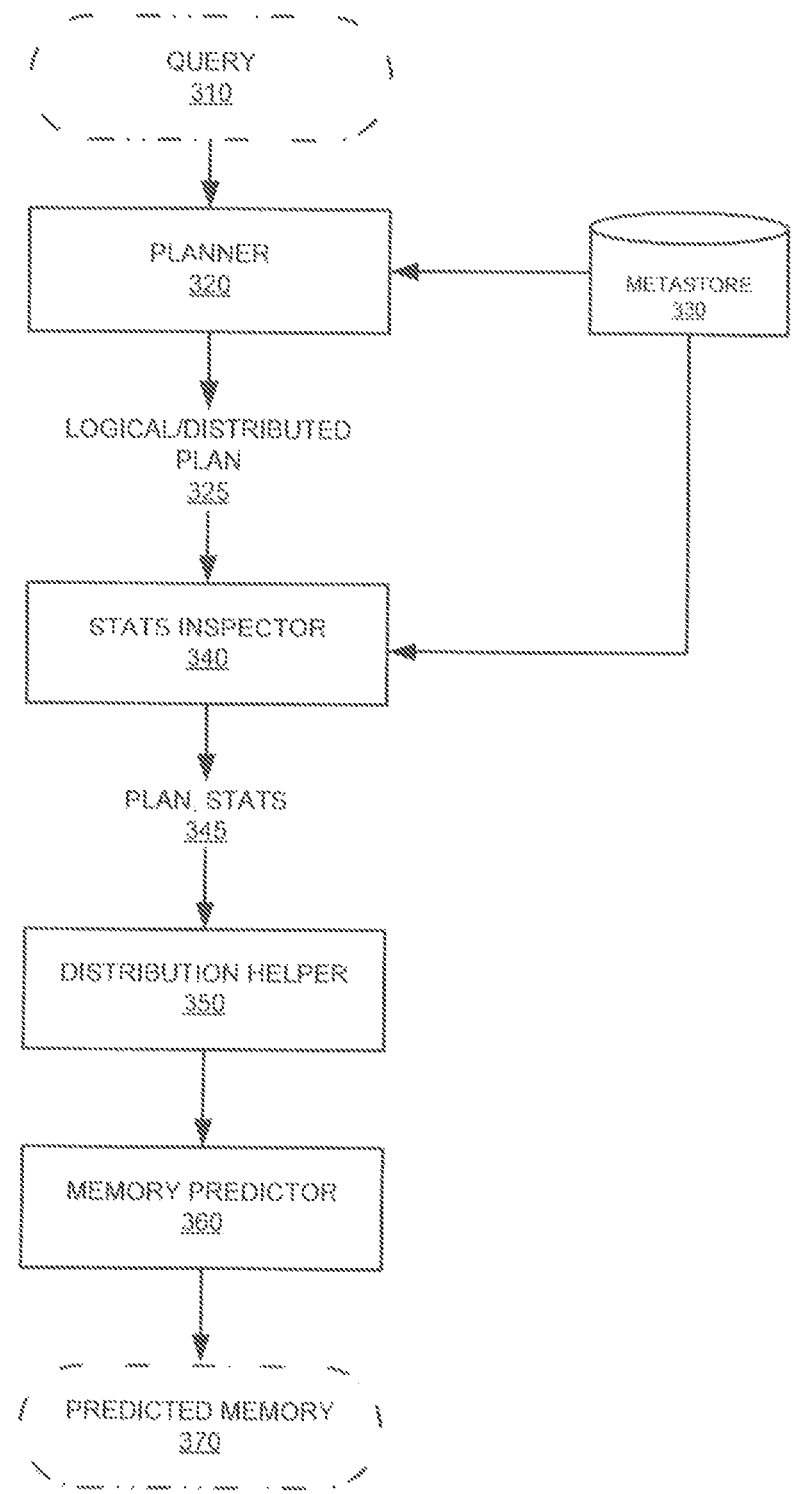

SYSTEMS AND METHODS FOR DETERMINING PEAK MEMORY REQUIREMENTS IN SQL PROCESSING ENGINES WITH CONCURRENT SUBTASKS

RELATED APPLICATIONS

The present application claims priority to U.S. Provisional Patent Application No. 62/855,056 filed on 31 May 2019, entitled "System and Methods tor Determining Peak Memory Requirements in SQL Processing Engines with Concurrent Subtasks," which is incorporated herein by reference in its entirety.

FIELD OF THE INVENTION present invention is generally directed to systems and methods for determining and provisioning peak memory requirements in Structured Query Language (SQL) Processing engines. More specifically, peak memory requirements may be accurately calculated even in systems with one or more concurrent subtasks.

BACKGROUND

Ensuring predictable performance for a job is a common requirement among distributed tile systems systems. SQL processing engines (such as but not limited to Presto or Hive) generally enable a user to manage data held in one or more relational databases. In general. Presto is an open source distributed SQL query engine for running interactive analytic queries against data sources of all sizes, ranging from gigabytes to petabytes. Presto generally uses cluster computing across various nodes for compute and/or storage functions, and can combine data from multiple sources (such as but not limited to Hadoop Distributed File Systems (HDFS), Amazon S3, Apache Cassandra or Kafka). Apache Ilive is generally guilt on top of HDFS to again provide data query and analysis. Hive interacts with MapReduce for queries over distributed data. Presto generally does not utilize MapReduce on each query, and does not write intermediate results to disk.

For in-memory distributed query processing systems such as Presto, if sufficient resources are not available at any point of time during execution of a task on even one of the worker nodes, the query fails. This problem may be aggravated when multiple queries from different users run concurrently on the same system. It is therefore both important—and difficult—to ensure that all queries running on a given cluster have sufficient resources available for execution at all nodes at all times.

In order to determine peak memory requirements for such SQL processing engines, most known approaches first estimates resources, and then isolates needed resources to the job. For example, Hadoop memory estimator. Impala Explain provides user with an execution plan for a statement, showing the low-level mechanisms that will be used to read the data, divide the work among nodes in a cluster, and transmit intermedia and final results across a network. Impala Explain may also illustrate for a user how parts of a query may be distributed among the nodes in a cluster and show how intermediate results may be combined at the end to produce the final result set.

Note that when the distributed job being run is a SQL command, tasks created often have an implicit dependency between themselves. Methodologies taught by prior art processes attempt to take this into account by using statistics to calculate memory requirements at task level, and then adding each task level together to determine a peak value at a query level. While this may account on one hand for the interdependencies, it does not provide an accurate resource estimation, since some subtasks may be executed concurrently, while others may depend on results from previously executed tasks. There are no systems or methods in the prior art to take such interdependencies into account and provide an accurate estimation of resource requirements in SQL processing engines.

SUMMARY OF THE INVENTION

In accordance with some embodiments of the present invention, aspects may include a method for estimating peak memory requirements of a specific database query scheduled to execute on one or more worker nodes, the method comprising: determining or obtaining a query execution plan; gathering statistics associated with each database table; breaking the query execution plan into one or more subtasks; calculating an estimated memory usage for each subtask using the statistics; determining or obtaining a dependency graph of the one or more subtasks; based at least in part on the dependency graph, determining which subtasks can execute concurrently on a single worker node; and totaling the amount of estimated memory for each subtask that can execute concurrently on a single worker node and setting this amount of estimated memory as the estimated peak memory requirement for the specific database query.

In accordance with some embodiments of the present invention aspects may include a method for estimating peak memory requirements of a specific database query scheduled to execute on one or more worker nodes, the method comprising: determining or obtaining a query execution plan; gathering statistics associated with each database table, the statistics comprising the size of the table: breaking the query execution plan into one or more subtasks; calculating an estimated memory usage for each subtask using the statistics, wherein the estimated memory usage for each subtask is determined at least in part based on the type of task and the quantity of data to be processed; determining or obtaining a dependency graph of the one or more subtasks, wherein the dependency graph may identify nodes as being pipelining operators. accumulating operators, or partially accumulating operators; based at least in part on the dependency graph, determining which subtasks can execute concurrently on a single worker node, at least in part by determining which nodes require a completed input from other nodes before beginning a task; and totaling the amount of estimated memory for each subtask that can execute concurrently on a single worker node and setting this amount of estimated memory as the estimated peak memory requirement for the specific database query.

These and other aspects will become apparent from the following description of the invention taken in conjunction with the following drawings, although variations and modifications may be affected without departing from the spirit and scope of the novel concepts of the invention.

DESCRIPTION OF THE DRAWINGS

The present invention can be more fully understood by reading the following detailed description together with the accompanying drawings, in which like reference indicators are used to designate like elements. The accompanying figures depict certain illustrative embodiments and may aid in understanding the following detailed description. Before any embodiment of the invention is explained in detail, it is to be understood that the invention is not limited in its application to the details of construction and the arrangements of components set forth in the following description or illustrated in the drawings. The embodiments depicted are to he understood as exemplary and in no way limiting of the overall scope of the invention. Also, it is to be understood that the phraseology and terminology used herein is for the purpose of description and should not be regarded as limiting. The detailed description will make reference to the following figures, in which:

FIG. 3 illustrates an exemplary architectural diagram of components used for memory estimation, in accordance with some embodiments of the present invention.

Figure 1:
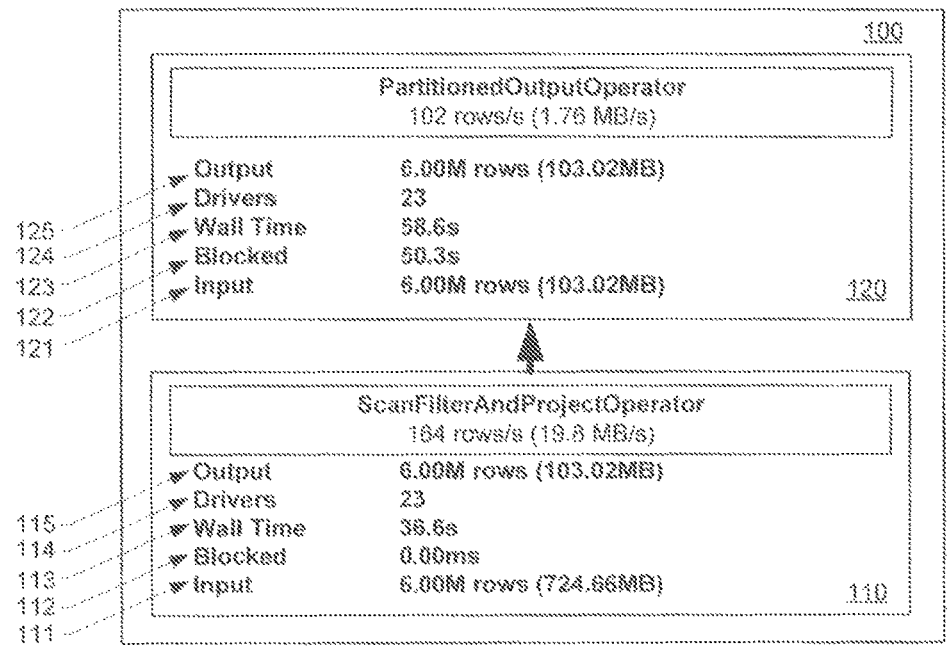
FIG. 1 illustrates an exemplary pipeline snapshot from a user interface associated with a SQL processing engine. in accordance with some embodiments of the present invention.

Before any embodiment of the invention is explained in detail, it is to be understood that the present invention is not limited in its application to the details of construction and the arrangements of components set forth in the following description or illustrated in the drawings. The present invention is capable of other embodiments and of being practiced or being carried out in various ways. Also, it is to be understood that the phraseology and terminology used herein is for the purpose of description and should not be regarded as

DETAILED DESCRIPTION OF THE INVENTION

The matters exemplified in this description arc provided to assist in a comprehensive understanding of various exemplary embodiments disclosed with reference to the accompanying figures. Accordingly, those of ordinary skill in the art will recognize that various changes and modifications of the exemplary embodiments described herein can be made without departing from the spirit and scope of the claimed invention. Descriptions of well-known functions and constructions are omitted for clarity and conciseness. Moreover, as used herein, the singular may be interpreted in the plural, and alternately, any term in the plural may be interpreted to be in the singular.

The present invention is directed to systems and methods for determining and provisioning peak memory requirements in Structured Query Language (SQL) Processing engines. More specifically, peak memory requirements may be accurately calculated even in systems with one or more concurrent subtasks that may be executed simultaneously, or more require interdependency. As noted above, a query run on a distributed file query processing system may fail if there are not sufficient resources on any worker node during execution of a task. Therefore, it is highly desirable that each query running on a cluster has sufficient resources available at all nodes at all times. Scheduling and resource provisioning decisions based on estimates of a cost model may greatly improve the chances that a query will have sufficient resources to execute.

As an initial matter, note that the systems and methods herein are described in the context of a Presto engine, but the system components and methods may be used for any distributed query processing system that may produce a dependency Directed Acyclic Graph (DAG) between subtasks.

In general, the present invention describes a system and method for calculating peak memory requirements where the computation task may be divided into several subtasks (some of which may execute concurrently) with dependencies between them. The present invention provides more accurate resource estimation by estimating an upper bound of resource requirements of queries (e.g., tasks) per worker node. This information may then be used for predicting likely success, as well as predicting better performance when multiple tasks are running at the saute time. A dynamic programming-based method is presented herein that may first estimate query resource (e.g., memory) requirements at different stages of query execution on each worker node and then estimate accurate memory requirements for each node, given query, and cluster specifications.

More specifically, a method for estimating peak memory requirements of a specific database query scheduled to execute on one or more worker nodes, may comprise determining or obtaining a query execution plan: gathering statistics associated with each database table; breaking the query execution plan into one or more subtasks; calculating an estimated memory usage for each subtask using the statistics: determining or obtaining a dependency graph of the one or more subtasks; based at least in part on the dependency graph, determining which subtasks can execute concurrently on a single worker node; and totaling the amount of estimated memory for each subtask that can execute concurrently on a single worker node and setting this amount of estimated memory as the estimated peak memory requirement for the specific database query.

The systems and methods described in this invention has several advantages over prior art, including but not limited to a tighter upper bound, since the present invention takes into account any dependencies between different subtasks and which subtasks may execute in parallel. Accurate provisioning may then be applied.

A directed acyclic graph (DAG) may be used to illustrate dependencies between tasks. In a dependency DAG, each task may be represented as a node, and if an output of one task is consumed by a subsequent task. an edge may be shown between the tasks. Presto generally creates a logical plan for submitted queries. A logical plan is essentially a DAG of tasks that may be executed in parallel, pipelining the intermediate results. Presto may then use this logical plan as well as table metadata—to generate a distributed plan. Distributed plans generally include assignments of tasks to specific nodes. A distributed plan may be comprised of one or more plan fragments that may comprise a set of operators running in parallel on the same node in a pipeline.

With reference to FIG. 1, an exemplary snapshot 100 from an operator pipeline will now be discussed. Snapshot 100 generally illustrates a plan fragment where the task "ScanFilterandProjectOperator" 110 is responsible for scanning data from the underlying data sources (for example, but not limited to, Amazon S3), filtering such data, and then projecting the columns to the consuming Operator. This data may then he passed to the task "PartitionedOutputOperator" 120. which may be responsible for partitioning this data and distributing it to consumers of this pipeline.

It can be seen that ScanFilterandProjectOperator 110 receives as an input 111 six (6) million rows, comprising 724.66 MR of data. This task 110 outputs 112 six (6) million rows, comprising 103.02 MR of data. This output 112 is received by task PartitionedOutputOperator 120 as an input 121, which outputs the same quantity of data 122. Additional details may be gleaned from the snapshot 100, such as time blocked 113, 123, wall time 114, 124, and the number of drivers 115, 125.

Figure 2:
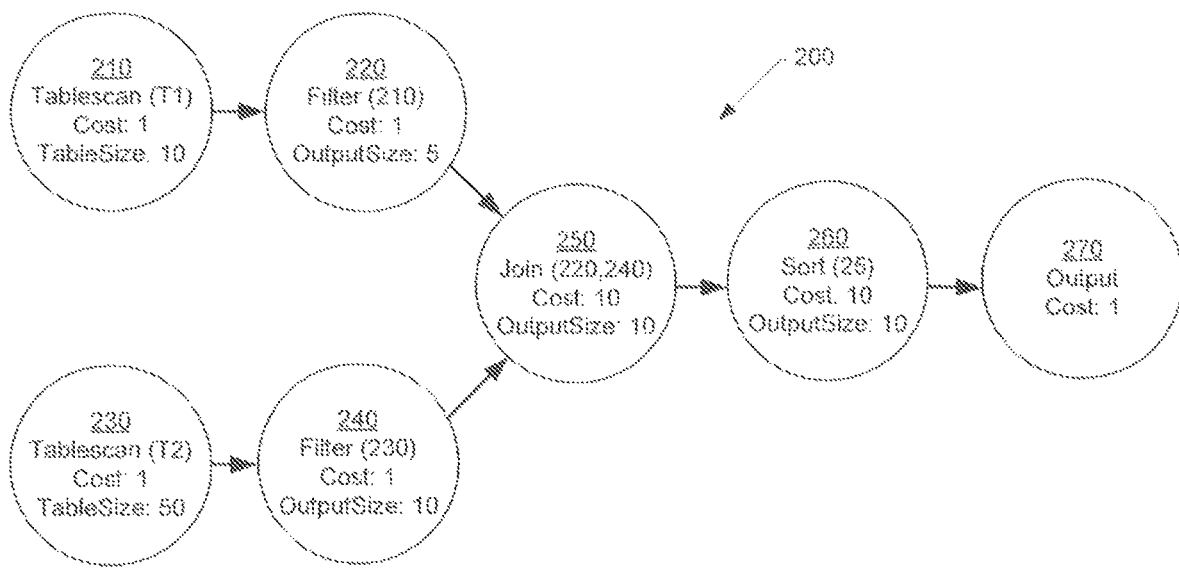
FIG. 2 illustrates an exemplary directed acyclic graph (DAG), in accordance with some embodiments of the present invention.

With reference to FIG. 2, an example will he discussed, corresponding to DAG 200. Before discussing in detail, note that each node represents an operator. An edge between two (2) nodes, for example between node i and node j may be represented as $V_{ij}$, and represents operator i consuming the output produced by operator j. An "accumulating operator" is an operator that accumulates data in underlying data structures, processes such data, and then returns results only after processing all of the input data (e.g. a data sort function). Such accumulating operators generally have a higher memory cost.

It can be seen from FIG. 2 that Tablescan 1 (T1) is provided from node 210 to node 220, where it is filtered. Tablescan 2 (T2) is provided from node 230 to node 240, where it is filtered. The output from node 220 and 240 are received at node 250, which joins the data. This is then output to node 260 which may sort the data, and then provide the data to node 270 for output.

"Pipelining operators" may operate on one page at a time, and generally have a lower memory cost. "Partially accumulating operators" may be operators that may accumulate data from one of the input sides, and then stream data from the other input side. HashJoinOperator, for example, accumulates data from the fell child in hashes, arrays, and then streams the output from the right child to join one page at a time.

With continued reference to FIG. 2, nodes 210, 220, 230, 240, and 270 may be pipelining operators, with lower associated memory costs (memory cost of one (1)). Node 250 may be a partially accumulating operator with a memory cost of ten (10)), and node 260 ma be an accumulating operator with a memory cost of ten (10).

With continued reference to FIG. 2, consider the query select T1.$c3$, T2.$c3$ from T1 join T2 on T1.$pk$ =T2.$pk$ where T1.$a$="XXX" and T2.$a$="XXX" order by T1.$c2$.

Note that nodes 240 and 260 cannot be active simultaneously, as join node 250 first accumulates the output of node 240 in hash tables, and only alter that begins producing results. Moreover, there is an indirect dependency between nodes 220 and 240. This is because node 250 is a partially accumulating operator and may start consuming data from node 220 only after it has consumed all available data from node 240. However, nodes 210, 220, 250, and 260 may be active simultaneously, since node 260 consumes the output of node 250, node 250 consumes the output of node 220, and node 220 consumes the output of node 210. Accordingly, it can be seen how the DAG presented at FIG. 2 illustrates the nature of the interdependencies and the impact this may have on task processing and resource estimation and allocation.

In general, methods in accordance with some embodiments of the present invention may be broken down to four (4) steps: (i) establish a one-to-one mapping between nodes in a logical and distributed plan; (ii) calculate input and output statistics of each operator recursively: (iii) calculate memory requirements of each operator based on the statistics from (ii) and data structures used by the operator's execution logic; and (iv) calculate memory requirements over a maximum set of operators that could be executed concurrently. In the example set forth in FIG. 2, the maximum memory consumption may be when nodes 260, 250, 220, and 210 arc active simultaneously—which would be a maximum memory requirement of twenty-two (22) units.

This process may start from leaf nodes, consider a subtree of current rood nodes, and calculate maximum memory requirements of any combination of nodes running in the subtree. For a given subtree, two (2) values may be tracked: (i) the maximum memory requirement of the subtree (max-Mem): and (ii) the maximum memory requirement when the root node of the subtree is active (maxAggregateMemWhen-RootActive).

Performing a post-order/depth first traversal, the values for nodes may be calculated by updating at each step the maxAggreguteMemWhenRootActive and the maxMem, where:

```
maxAggregateMemWhenRootActive:
    maxAggregateMemWhenRootActive = self.memReq
    for each child ∈ this.children
        If child.accumulating:
            maxAggregateMemWhenRootActive +=
                child.memReq
        else:
            maxAggregateMemWhenRootActive +=
                child.maxAggregateWhenRootActive
    maxMem = Max(maxAggregateWhenRootActive.
Σchild.maxAggregateMemWhenRootActive.
```

This algorithm updates maxAggregateMemWhenRootActive of the root node (of the subtree under consideration) to be: the summation of one value corresponding to each child and operating cost of the node. If the child is an accumulating node, we consider only child's operating cost since descendants have completed processing. It the child is a page processing node, then we consider its maxAggregateMemWhenRootActive, which in effect verifies all active nodes in a child's descendants are considered.

With reference to FIG. 3, an exemplary architecture diagram 300 will now be discussed. A query 310 may be submitted to a planner 320, which may receive information from a metastore 330 and generate a logical and distributed plan for input query 325, which may be output to a statistics inspector 340. The statistics inspector 340 may also receive inputs from the metastore 330 and may check if the statistics required for predicting memory are present in the query, or if not, notify that a prediction cannot be determined and exits the process. The statistics inspector 340 may output a plan and statistics 345 to a distribution helper 350, which may map distributed plan nodes with a physical plan to calculate concurrency for each task. Distribution helper 350 may then output data to a memory predictor 360, which may, using (a) the statistics to calculate the amount of data to be processed: (b) the logical/distributed plans to obtain a task dependency DAG; and (c) the distribution information regarding the number of executor nodes, calculate a maximum amount of memory that could be used on any node. The memory predictor 360 may then output this predicted memory amount 370.

It will be understood that the specific embodiments of the present invention shown and described herein are exemplary only. Numerous variations, changes, substitutions and equivalents will now occur to those skilled in the art without departing from the spirit and scope of the invention. Accordingly, it is intended that all subject matter described herein and shown in the accompanying drawings be regarded us illustrative only, and not in a limiting sense.

What is claimed is:

1. A method for estimating peak memory requirements of a specific database query scheduled to execute on one or more worker nodes in a Structured Query Language (SQL) processing engine, the method comprising:
  determining or obtaining a query execution plan;
  gathering statistics associated with each database table;
  breaking the query execution plan into one or more subtasks and determining any dependencies between subtasks and which subtasks may execute in parallel;
  calculating an estimated memory usage for each subtask using the statistics;
  determining or obtaining a directed acyclic dependency graph of the one or more subtasks;
  based at least in part on the directed acyclic dependency graph, determining any dependencies between subtasks and which subtasks can execute concurrently on a single worker node, wherein
    each node in the directed acyclic graph represents an operator, and wherein each operator can be categorized by its function and general memory cost, the operators comprising:
      one or more accumulating operators that accumulate data in underlying data structures, process the data, and return results only after processing all of the input data, accumulating operators having a high memory cost;
      one or more partially accumulating operators that accumulate data from one of the input sides and stream data from a second input side, partially accumulating operators having a medium memory cost; and
      one or more pipelining operators that operate on one page at a time and has a low memory cost;
  totaling the amount of estimated memory for each subtask on a single worker node and setting this amount of estimated memory as the estimated peak memory requirement for the specific database query.

2. The method of claim 1, wherein the statistics associated with each database table includes the size of the table.

3. The method of claim 1, wherein the estimated memory usage for each subtask is determined at least in part based on the type of task and the quantity of data to be processed.

4. The method of claim 1, wherein the step of determining which subtasks can execute concurrently on a single worker node comprises determining which nodes require a completed input from other nodes before beginning a task.

5. A method for estimating peak memory requirements of a specific database query scheduled to execute on one or more worker nodes, the method comprising:
  determining or obtaining a query execution plan;
  gathering statistics associated with each database table, the statistics comprising the size of the table;
  breaking the query execution plan into one or more subtasks;
  calculating an estimated memory usage for each subtask using the statistics, wherein the estimated memory usage for each subtask is determined at least in part based on the type of task and the quantity of data to be processed;
  determining or obtaining a directed acyclic dependency graph of the one or more subtasks, wherein the directed acyclic dependency graph may identify nodes as being pipelining operators, accumulating operators, or partially accumulating operators;
  based at least in part on the directed acyclic dependency graph, determining which subtasks can execute concurrently on a single worker node, at least in part by determining which nodes require a completed input from other nodes before beginning a task, wherein
    each node in the directed acyclic graph represents an operator, and wherein each operator can be categorized by its function and general memory cost, the operators comprising:
      one or more accumulating operators that accumulate data in underlying data structures, process the data, and return results only after processing all of the input data, accumulating operators having a high memory cost;
      one or more partially accumulating operators that accumulate data from one of the input sides and stream data from a second input side, partially accumulating operators having a medium memory cost; and
      one or more pipelining operators that operate on one page at a time and has a low memory cost; and
  totaling the amount of estimated memory for each subtask that can execute concurrently on a single worker node and setting this amount of estimated memory as the estimated peak memory requirement for the specific database query, where accumulating operators and partially accumulating operators are assigned a greater memory cost than pipelining operators.

6. A method for estimating peak memory requirements of a specific database query scheduled to execute on one or more worker nodes, the method comprising:
  determining or obtaining a query execution plan;
  gathering statistics associated with each database table;
  breaking the query execution plan into one or more subtasks;
  calculating an estimated memory usage for each subtask using the statistics;
  determining or obtaining a directed acyclic dependency graph of the one or more subtasks, the dependency graph identifying nodes as being pipelining operators, accumulating operators, or partially accumulating operators;
  based at least in part on the directed acyclic dependency graph, determining which subtasks can execute concurrently on a single worker node, wherein
    each node in the directed acyclic graph represents an operator, and wherein each operator can be categorized by its function and general memory cost, the operators comprising:
      one or more accumulating operators that accumulate data in underlying data structures, process the data, and return results only after processing all of the input data, accumulating operators having a high memory cost;
      one or more partially accumulating operators that accumulate data from one of the input sides and stream data from a second input side, partially accumulating operators having a medium memory cost; and
      one or more pipelining operators that operate on one page at a time and has a low memory cost; and
  totaling the amount of estimated memory for each subtask that can execute concurrently on a single worker node and setting this amount of estimated memory as the estimated peak memory requirement for the specific database query, where accumulating operators and partially accumulating operators are assigned a greater memory cost than pipelining operators.

* * * * *